United States Patent
Lee

(10) Patent No.: US 10,133,101 B2
(45) Date of Patent: Nov. 20, 2018

(54) LIQUID CRYSTAL DISPLAY DEVICE

(71) Applicant: LG Display Co., Ltd., Seoul (KR)

(72) Inventor: SangSoo Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/379,725

(22) Filed: Dec. 15, 2016

(65) Prior Publication Data

US 2017/0184910 A1 Jun. 29, 2017

(30) Foreign Application Priority Data

Dec. 29, 2015 (KR) .................. 10-2015-0188513

(51) Int. Cl.
*F21V 8/00* (2006.01)
*G02F 1/1333* (2006.01)
*G02F 1/1335* (2006.01)

(52) U.S. Cl.
CPC ........ *G02F 1/133308* (2013.01); *G02B 6/005* (2013.01); *G02B 6/0088* (2013.01); *G02B 6/009* (2013.01); *G02B 6/0091* (2013.01); *G02F 1/133615* (2013.01); *G02F 2001/133317* (2013.01)

(58) Field of Classification Search
CPC ........ G02F 2001/133317; G02F 2001/133311; G02F 2001/133314; G02F 2001/13332; G02F 2001/133322; G02F 1/133308; G02F 1/133608; G02B 6/005; G02B 6/0088

See application file for complete search history.

(56) References Cited

U.S. PATENT DOCUMENTS

| 2015/0341587 | A1* | 11/2015 | Chikazawa | .......... G02B 6/0091 348/725 |
| 2016/0085109 | A1* | 3/2016 | Baek | ................ G02F 1/133308 362/607 |
| 2017/0090112 | A1* | 3/2017 | Shim | .................... G02B 6/0068 |
| 2017/0219767 | A1* | 8/2017 | Matsumoto | .......... G02B 6/0088 362/606 |

FOREIGN PATENT DOCUMENTS

WO WO 2016059721 A1 * 4/2016

* cited by examiner

*Primary Examiner* — Joseph L Williams
*Assistant Examiner* — Jose M Diaz
(74) *Attorney, Agent, or Firm* — Morgan, Lewis & Bockius LLP

(57) ABSTRACT

Disclosed is a liquid crystal display device that may include a backlight unit including a light guiding plate with a light-incidence portion and an optical sheet portion disposed on the light guiding plate; and a panel support member for supporting a rear edge portion of a liquid crystal display panel, and preparing an air gap between the light guiding plate and one edge portion of the optical sheet portion disposed on the light-incidence portion, wherein it is possible to prevent defects of front luminance in the light-incidence portion with a small bezel width, and to improve mechanical reliability.

18 Claims, 7 Drawing Sheets

LIQUID CRYSTAL DISPLAY DEVICE

CROSS REFERENCE TO RELATED APPLICATIONS

This application claims the benefit of the Korean Patent Application No. 10-2015-0188513 filed on Dec. 29, 2015, which is hereby incorporated by reference as if fully set forth herein.

BACKGROUND

Field of the Disclosure

The present invention relates to a display device, and more particularly, to a liquid crystal display device.

Discussion of the Related Art

Generally, a liquid crystal display device displays an image by the use of thin film transistor functioning as a switching element. The liquid crystal display device is widely used for display devices of notebook computer, tablet computer, smart phone, portable display device, and portable information device as well as display devices of television or monitor. The liquid crystal display device is not a self light emitting display device, whereby a backlight unit for emitting light is disposed under a liquid crystal display panel. That is, the liquid crystal display device displays an image by the use of light emitted from the backlight unit.

FIG. 1 is a cross sectional view illustrating a related art liquid crystal display device.

Referring to FIG. 1, the related art liquid crystal display device may include a liquid crystal display panel 10, a backlight unit 20, a rear cover 30, a guide frame 40, and a front cover 50.

The liquid crystal display panel 10 may include confronting lower and upper substrates 11 and 13 bonded to each other with a liquid crystal layer interposed in-between, a lower polarizing film 15 attached to a rear surface of the lower substrate 11, and an upper polarizing film 17 attached to a front surface of the upper substrate 13.

The backlight unit 20 is disposed at a rear surface of the liquid crystal display panel 10, wherein the backlight unit 20 emits light to the liquid crystal display panel 10. The backlight unit 20 may include a light guiding plate 21 disposed at a rear surface of the liquid crystal display panel 10, a plurality of light emitting diode packages 23 for emitting light to one lateral surface of the light guiding plate 21, a reflective sheet 25 disposed at a rear surface of the light guiding plate 21, and an optical sheet portion 27 disposed on the light guiding plate 21.

The rear cover 30 receives the backlight unit 20 therein, and supports the guide frame 40.

The guide frame 40 supports a rear edge of the liquid crystal display panel 10, and covers a lateral surface of the liquid crystal display panel 10. To this end, the guide frame 40 may include a guide sidewall 41 for covering each lateral surface of the liquid crystal display panel 10 and each lateral surface of the rear cover 30, and a panel supporter 43 protruding in a rectangular frame shape from an inner lateral surface of the guide sidewall 41 and supporting the rear edge of the liquid crystal display panel 10.

The front cover 50 is connected with the guide sidewall 41 of the guide frame 40, to thereby cover a front edge portion of the liquid crystal display panel 10 and each lateral surface of the guide frame 40.

Accordingly, an interval between a display area (AA) of the liquid crystal display panel 10 and the plurality of light emitting diode packages 23 is decreased in the related art liquid crystal display device, to thereby obtain a small bezel width (BW).

However, as shown in FIGS. 2 and 3, according as an optical distance (OL) between the display area (AA) of the liquid crystal display panel 10 and the plurality of light emitting diode packages 23 is decreased in the related art liquid crystal display device, a hot spot may occur in the display area (AA) of the liquid crystal display panel 10. The hot spot may be caused by a luminance difference between a bright area (LA) which is irradiated with light emitted from the plurality of light emitting diode packages 23 and a dark area (DA) which is positioned between each of the light emitting diode packages 23 and is not irradiated with light emitted from the plurality of light emitting diode packages 23.

Also, the optical sheet portion 27 is disposed on an light-incidence portion of the light guiding plate 21 in the related art liquid crystal display device while being not fixed thereon, whereby the optical sheet portion 27 might be cracked or moved by vibration for a mechanical reliability test.

Accordingly, a front luminance defect may occur due to the hot spot in the light-incidence portion of the related art liquid crystal display device, and reliability of the related art liquid crystal display device may be lowered due to the crack or movement of the optical sheet portion 27.

SUMMARY

Accordingly, embodiments of the present invention are directed to a liquid crystal display device that substantially obviates one or more problems due to limitations and disadvantages of the related art.

An object of the present invention is to provide a liquid crystal display device with a small bezel width to prevent a hot spot in a light-incidence portion and to improve mechanical reliability.

Additional features and advantages of embodiments of the invention will be set forth in the description that follows, and in part will be apparent from the description, or may be learned by practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, a liquid crystal display device may comprise a backlight unit including a light guiding plate with a light-incidence portion and an optical sheet portion disposed on the light guiding plate; and a panel support member for supporting a rear edge portion of a liquid crystal display panel, and preparing an air gap between the light guiding plate and one edge portion of the optical sheet portion disposed on the light-incidence portion.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principles of embodiments of the invention. In the drawings.

DETAILED DESCRIPTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a liquid crystal display device according to the preferred embodiment of the present invention will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
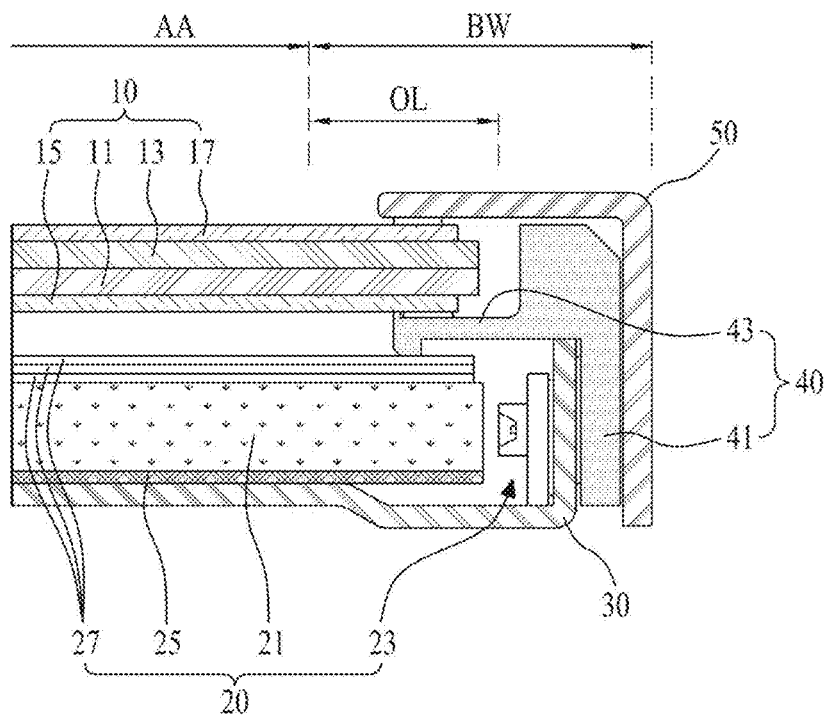
FIG. 1 is a cross sectional view illustrating a related art liquid crystal display device.
Figure 2:
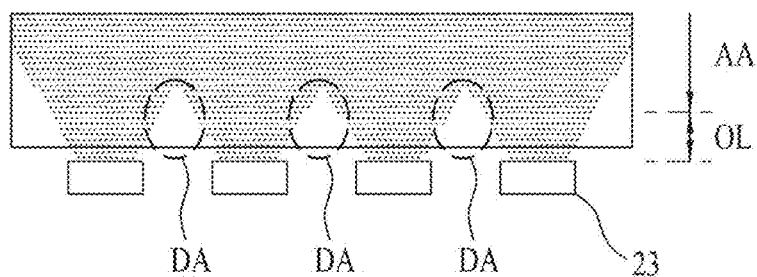
FIG. 2 illustrates a hot spot occurring in a light-incidence portion shown in FIG. 1.
Figure 3:
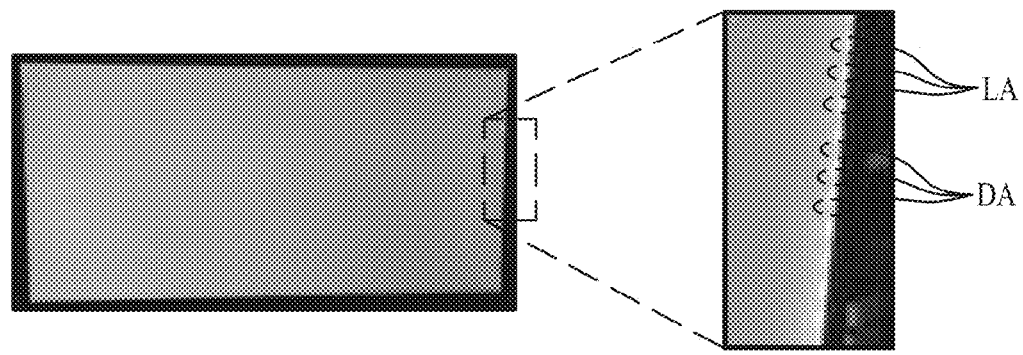
FIG. 3 illustrates a front luminance defect in the light-incidence portion of the related art liquid crystal display device.
Figure 4:
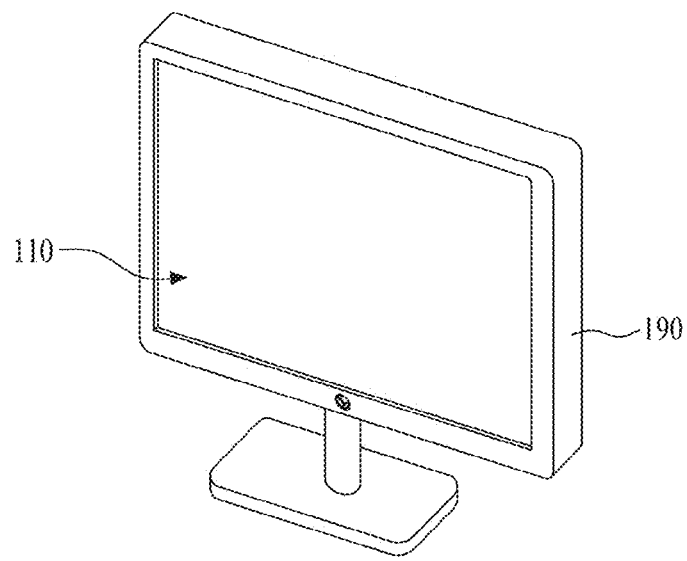
FIG. 4 illustrates a liquid crystal display device according to one embodiment of the present invention.
Figure 5:
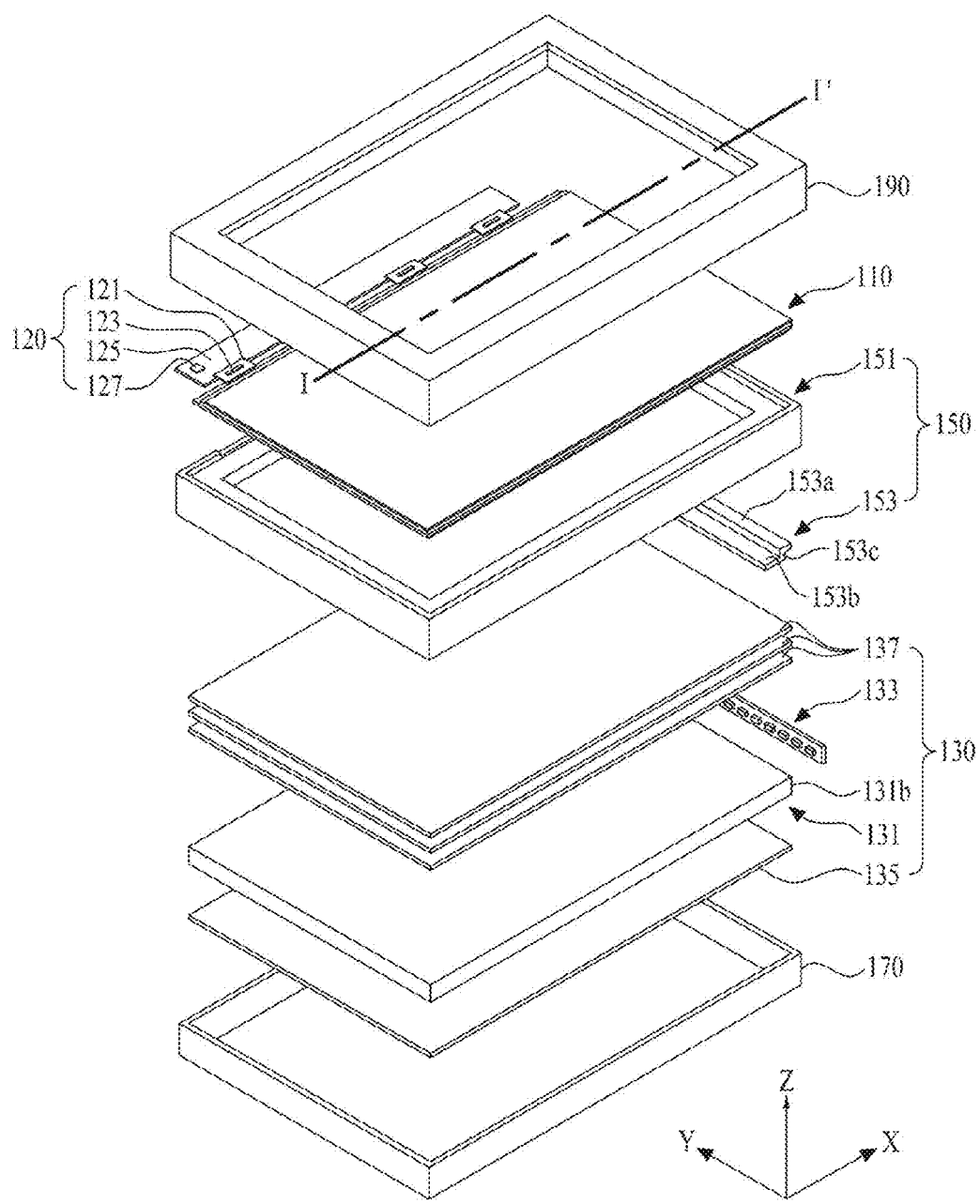
FIG. 5 is an exploded perspective view of the liquid crystal display device shown in FIG. 4.
Figure 6:
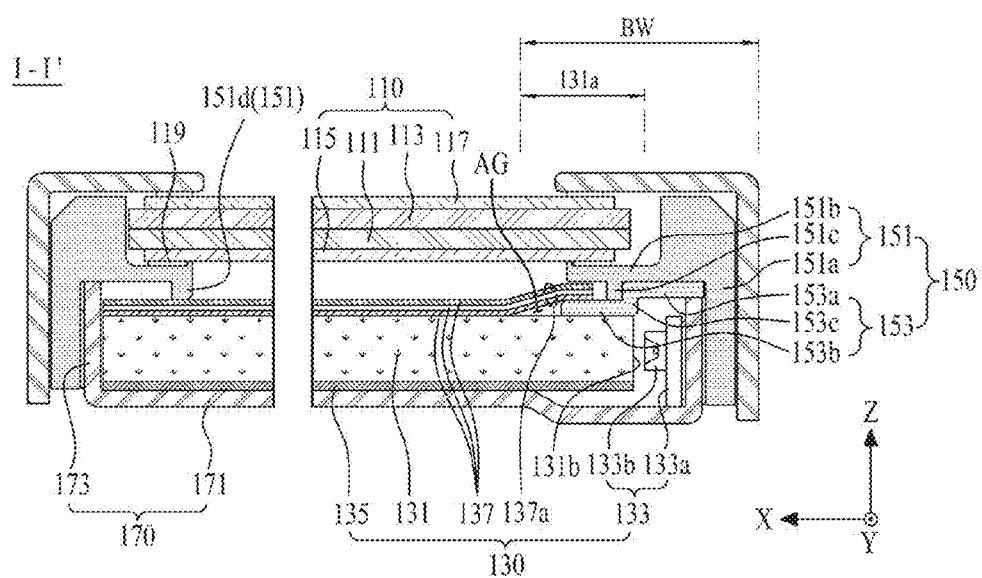
FIG. 6 is a cross sectional view along I-I' of FIG. 5.

FIG. 4 illustrates a liquid crystal display device according to one embodiment of the present invention. FIG. 5 is an exploded perspective view of the liquid crystal display device shown in FIG. 4. FIG. 6 is a cross sectional view along I-I' of FIG. 5.

Referring to FIGS. 4 to 6, the liquid crystal display device according to one embodiment of the present invention may include a liquid crystal display panel 110, a backlight unit 130, a panel support member 150, a rear cover 170, and a front cover 190.

The liquid crystal display panel 110 according to one embodiment of the present invention displays an image by the use of light emitted from the backlight unit 130. The liquid crystal display panel 110 according to one embodiment of the present invention may include a lower substrate 111, an upper substrate 113, a lower polarizing member 115, and an upper polarizing member 117.

The lower substrates 111 is a thin film transistor array substrate, wherein the lower substrate 111 includes a pixel array having a plurality of pixels provided every pixel region defined by crossing a plurality of gate lines and a plurality of data lines. Each pixel may include a thin film transistor connected with the gate and data lines, a pixel electrode connected with the thin film transistor, and a common electrode provided adjacent to the pixel electrode and supplied with a common voltage.

In a lower edge portion of the lower substrate 111, there is a pad portion connected with each signal line, wherein the pad portion is connected with a panel driving circuit 120. Also, an internal gate driving circuit for supplying a gate (or scan) signal to the gate line is provided in a non-display area of a vertical side of the lower substrate 111. The internal gate driving circuit is manufactured together with the thin film transistor of each pixel while being connected with each gate line.

The upper substrate 113 may include a pixel defining pattern for defining an opening area overlapped with each pixel region in the lower substrate 111, and a color filter provided in the opening area. The upper substrate 113 may be bonded to the lower substrate 111 by the use of sealant, wherein a liquid crystal layer may be interposed between the lower and upper substrates 111 and 113 confronting each other.

The liquid crystal layer is interposed between the lower substrate 111 and the upper substrate 113, wherein the liquid crystal layer is formed of liquid crystal having liquid crystal molecules whose alignment is changed in accordance with an electric field formed by the common and data voltages applied to each pixel.

The lower polarizing member 115 is attached to a rear surface of the lower substrate 111, wherein the lower polarizing member 115 polarizes incident light, which is emitted from the backlight unit 130, in a first polarizing axis, whereby the lower substrate 111 is irradiated with the light.

The upper polarizing member 117 is attached to a front surface of the upper substrate 113, wherein the upper polarizing member 117 polarizes light which is emitted to the outside via the upper substrate 113. The upper polarizing member 117 according to one embodiment of the present invention may be formed of a polarizing film attached to the front surface of the upper substrate 113, wherein the polarizing film may polarize color light, which is emitted to the outside via the upper substrate 113, in a second polarizing axis which is different from the first polarizing axis. The upper polarizing member 117 according to another embodiment of the present invention may include the polarizing film, and a retarder film attached to an upper surface of the polarizing film, wherein the retarder film includes a left-eye retarder pattern and a right-eye retarder pattern so as to separate a 3-dimensional image displayed on the liquid crystal display panel 110, that is, left-eye and right-eye images into different polarizing states.

The panel driving circuit 120 is connected with the par portion prepared in the liquid crystal display panel 110, that is, the lower substrate 111, wherein the panel driving circuit 120 drives each pixel of the liquid crystal display panel 110, and thus displays a predetermined color image on the liquid crystal display panel 110. The panel driving circuit 120 according to one embodiment of the present invention may include a plurality of flexible printed circuit films 121 attached to the pad portion of the lower substrate 111, a driving integrated circuit 123 mounted on each of the plurality of flexible printed circuit films 121, a source printed circuit board 125 connected with the plurality of flexible printed circuit films 121, and a timing controller 127 mounted on the source printed circuit board 125.

Each of the plurality of flexible printed circuit films 121 is bent toward a rear surface of the rear cover 127 along one lateral surface of the liquid crystal display panel 110.

The driving integrated circuit 123 receives a data control signal and data for each pixel supplied from the timing controller 127, converts the data for each pixel into an analog-type data signal in accordance with the data control signal, and supplies the analog-type data signal to the corresponding data line through the pad portion.

The source printed circuit board 125 is connected with the plurality of flexible printed circuit films 121. The source printed circuit board 125 provides a signal, which is supplied from an external display driving circuit through a user connector, that is, a digital video signal and a timing synchronization signal to the timing controller 127, and provides various signals, which are output from the timing controller 127, to the driving integrated circuit 123 and the liquid crystal display panel 110 through the flexible printed circuit film 121.

The timing controller 127 receives the digital video signal and the timing synchronization signal provided from the display driving circuit, generates the data for each pixel by aligning the digital video signal in accordance with a pixel alignment structure of the liquid crystal display panel 110 on the basis of the timing synchronization signal, and provides the generated data for each pixel to the driving integrated circuit 123. Also, the timing controller 127 generates a gate control signal and a data control signal based on the timing synchronization signal, and controls driving timing of each of the driving integrated circuit 123 and the internal gate driving circuit. Additionally, the timing controller 127 controls the backlight unit 130 by a local dimming technology so that it is possible to individually control a luminance for each local area of the liquid crystal display panel 110.

In the panel driving circuit 120, the source printed circuit board 125 and an edge portion of one side in each of the plurality of flexible printed circuit films 121 including portions connected with the source printed circuit board 125 are disposed at the rear surface of the rear cover 170. Also, the panel driving circuit 120 disposed at the rear surface of the rear cover 170 is covered by a cover shield.

The backlight unit 130 is received in a space of the rear cover 170, whereby a lower surface of the liquid crystal display panel 110 is irradiated with light emitted from the backlight unit 130. The backlight unit 130 according to one embodiment of the present invention may include a light guiding plate 131, a light source 133, a reflective sheet 135, and an optical sheet portion 137.

The light guiding plate 131 is disposed at the rear surface of the liquid crystal display panel 110. The light guiding plate 131 guides light provided from the light source 133 toward the liquid crystal display panel 110. To this end, the light guiding plate 131 according to one embodiment of the present invention may include a light-incidence portion 131a on which the light emitted from the light source 133 is incident. For example, the light-incidence portion 131a may be defined by an edge portion of one vertical side including one short side of the light guiding plate 131, and the light-incidence portion 131a may include a light-incidence lateral surface 131b defined by one short side of the light guiding plate 131. At this time, the light-incidence portion 131a may include a lower long side of the light guiding plate 131 to be overlapped with the pad portion of the liquid crystal display panel 110. In this case, it is possible to reduce a bezel width in each of upper, left and right sides of the liquid crystal display device. Also, the light-incidence portion 131a according to another embodiment of the present invention may include an upper long side of the light guiding plate 131 which is not overlapped with the pad portion of the liquid crystal display panel 110. In this case, it is possible to identically maintain a bezel width in each of upper and lower sides of the liquid crystal display device.

The light source 133 emits light to the light-incidence lateral surface 131b of the light guiding plate 131, to thereby provide the light to the light-incidence portion 131a. The light source 133 according to one embodiment of the present invention may include a light source printed circuit board 133a, and a plurality of light emission diode packages 133b.

The vertically-standing light source printed circuit board 133a is provided in parallel to the light-incidence lateral surface 131b of the light guiding plate 131. Accordingly, an upper surface of the light source printed circuit board 133a, that is, a mounting surface for the light emission diode package 133b is provided at a predetermined interval from the light-incidence lateral surface 131b of the light guiding plate 131 while being confronted with the light-incidence lateral surface 131b of the light guiding plate 131.

Each of the plurality of light emission diode packages 133b is mounted on the mounting surface for the light emission diode package 133b, wherein the plurality of light emission diode packages 133b are provided at fixed intervals along a length direction (Y) of the light-incidence lateral surface 131b. The plurality of light emission diode packages 133b emit white light in accordance with a light source driving signal supplied from a backlight driver through the light source printed circuit board 133a, to thereby provide the white light to the light-incidence lateral surface1 131b of the light guiding plate 131.

Selectively, the light source 133 according to one embodiment of the present invention may further include a light source cover. The light source cover, which is prepared to have "L"-shaped cross section, supports the light source printed circuit board 133a, and releases heat generated by the light source 133 toward the rear cover 170.

The reflective sheet 135 is disposed at the rear surface of the light guiding plate 131, wherein the reflective sheet 135 reflects the incident light, which is guided by the light guiding plate 131, toward the light guiding plate 131, to thereby minimize a loss of light advancing toward the rear surface of the light guiding plate 131.

The optical sheet portion 137 is disposed on the light guiding plate 131, wherein the optical sheet portion 137 enhances the luminance properties of incident light from the light guiding plate 131. For example, the optical sheet portion 137 may include a diffusion sheet, a prism sheet, and a dual brightness enhancement film, but not limited to this structure. The optical sheet portion 137 may be formed in a deposition structure including at least two selected among a diffusion sheet, a prism sheet, a dual brightness enhancement film, and a lenticular sheet.

The panel support member 150 supports a rear edge portion of the liquid crystal display panel 110, and prepares an air gap (AG) between the light guiding plate 131 and one edge portion 137a of one side of the optical sheet portion 137 disposed on the light-incidence portion 131a of the light guiding plate 131, to thereby minimize or prevent a hot spot occurring in the light-incidence portion 131a of the light guiding plate 131. To this end, the panel support member 150 according to one embodiment of the present invention may include a support frame 151 and a sheet support member 153.

The support frame 151 supports the rear edge portion of the liquid crystal display panel 110. The support frame 151 according to one embodiment of the present invention may include a frame sidewall 151a, a panel support portion 151b, and a protruding portion 151c.

The frame sidewall 151a is vertically prepared to cover each lateral surface of the backlight unit 130, and each lateral surface of the liquid crystal display panel 110.

The panel support portion 151b is prepared in a rectangular band shape at an inner lateral surface of the frame sidewall 151a, to thereby support the rear edge portion of the liquid crystal display panel 110. The panel support portion 151b is disposed between the optical sheet portion 137 and the liquid crystal display panel 110, and the panel support portion 151b supports the rear edge portion of the liquid crystal display panel 110 through the use of shock-absorbing member (shock-absorbing pad) 119. Alternatively, instead of the shock-absorbing member 119, the panel support portion 151b may be connected with the rear edge portion of the liquid crystal display panel 110 through the use of panel connection member. In this case, the panel connection member may be an adhesive or double-sided tape.

The protruding portion 151c protrudes from a lower surface of the panel support portion 151b overlapped with the light-incidence portion 131a of the light guiding plate 131 toward the sheet support member 153. The protruding portion 151c covers a lateral surface of one edge portion 137a of the optical sheet portion 137 overlapped with the light-incidence portion 131a of the light guiding plate 131. The protruding portion 151c prevents one edge portion 137a of the optical sheet portion 137 disposed on the light-incidence portion 131a of the light guiding plate 131 from being moved.

Additionally, the support frame 151 may further include a sheet fixing protrusion 151d. The sheet fixing protrusion 151d protrudes from a lower surface of the panel support portion 151b overlapped with remaining edge portions except the light-incidence portion 131a of the light guiding plate 131 toward an upper surface of the optical sheet portion 137. The sheet fixing protrusion 151d presses an upper surface of the remaining edge portions except one edge portion of the optical sheet portion 137, thereby fixing the optical sheet portion 137 and preventing the optical sheet portion 137 from being moved.

The panel support portion 151 may be formed of a plastic material. Especially, the panel support portion 151 may be formed of a black-colored plastic material so as to minimize or prevent a light leakage at a lateral surface of the backlight unit 130.

The sheet support member 153 is provided on the light-incidence portion 131a of the light guiding plate 131, and is interposed between the light guiding plate 131 and one edge portion 137a of the optical sheet portion 137. The sheet support member 153 is disposed under the panel support portion 151b of the support frame 151, to thereby cover the light source 133 and the light-incidence portion 131a of the light guiding plate 131. Especially, the sheet support member 153 supports one edge portion 137a of the optical sheet portion 137 on the light-incidence portion 131a of the light guiding plate 131 so that it is possible to prepare the air gap (AG) between the light guiding plate 131 and one edge portion 137a of the optical sheet portion 137, to thereby minimize or prevent the hot spot occurring in the light-incidence portion 131a of the light guiding plate 131 when the light which is incident on the light-incidence portion 131a of the light guiding plate 131 is scattered by the air gap (AG). To this end, the sheet support member 153 may include a first support bar 153a, a second support bar 153b, and a connection sidewall 153c.

The first support bar 153a is prepared in a linear-shaped flat plate, and is supported by the rear cover 170. The first support bar 153a is disposed under the panel support portion 151b of the support frame 151 overlapped with the light-incidence portion 131a of the light guiding plate 131, to thereby cover an upper side of the light source 133.

The second support bar 153b is prepared in a linear-shaped flat plate, and is disposed on the light-incidence portion 131a of the light guiding plate 131, thereby supporting one edge portion 137a of the optical sheet portion 137 and preparing the air gap (AG) between the light guiding plate 131 and one edge portion 137a of the optical sheet portion 137. The air gap (AG) is prepared in a stepped portion between the light guiding plate 131 and the second support bar 153b along a length direction of the light-incidence lateral surface 131b by one edge portion 137a of the optical sheet portion 137 for covering an upper surface of the light guiding plate 131 and an upper surface of the second support bar 153b.

Additionally, one edge portion 137a of the optical sheet portion 137 is inserted into a sheet insertion space between the sheet support member 153, that is, the second support bar 153b and a lower surface of the panel support portion 151b prepared by the protruding portion 151c of the support frame 151 so that it is possible to prevent one edge portion 137a of the optical sheet portion 137 from being moved.

The connection sidewall 153c is provided to connect the first support bar 153a and the second support bar 153b with each other, and is prepared to be in contact with the protruding portion 151c provided in the panel support portion 151b. In this case, an upper side of the connection sidewall 153c is vertically connected with an inner end of the first support bar 153a, and a lower side of the connection sidewall 153c is vertically connected with an outer end of the second support bar 153b. Accordingly, the first support bar 153a and the second support bar 153b are provided in a stepped shape with the connection sidewall 153c disposed in-between. Eventually, the second support bar 153b is stepped from the first support bar 153a so that the second support bar 153b is inserted into a space between the light guiding plate 131 and one edge portion 137a of the optical sheet portion 137, to thereby prepare the air gap (AG) between the light guiding plate 131 and one edge portion 137a of the optical sheet portion 137.

The sheet support member 153 is formed of a white-colored plastic material which facilitates a light scattering in the air gap (AG). Accordingly, the air gap (AG), which is formed of an air layer, scatters the light which is incident on the light-incidence portion 131a of the light guiding plate 131 and is advancing toward the optical sheet portion 137, to thereby minimize or prevent the hot spot occurring in the light-incidence portion 131a of the light guiding plate 131 in accordance with a distance between each of the plurality of light emission diode packages 133b. That is, the light advancing from the light guiding plate 131 to the air gap (AG) is scattered in the air gap (AG) by a refraction difference between the light guiding plate 131 and the air layer and a light reflection on the second support bar 153b, whereby a light amount is increased in an area which is not irradiated with the light emitted from each of the plurality of light emission diode packages 133b.

According as the air gap (AG) is prepared between the light guiding plate 131 and one edge portion 137a of the optical sheet portion 137, it is possible to realize a uniform luminance on the light-incidence portion 131a of the light guiding plate 131 by the light scattering occurring in the air gap (AG), to thereby minimize or prevent the hot spot occurring in the light-incidence portion 131a of the light guiding plate 131. Also, the sheet support member 153 with a white color is disposed only on the light-incidence portion 131a of the light guiding plate 131 so that it is possible to prevent black line defects by the support frame 151 with a black color.

The rear cover 170 receives the backlight unit 130 therein, and supports the panel support member 150. The rear cover 170 corresponds to the rearmost case of the liquid crystal display device. The rear cover 170 may be formed of a metal material or a plastic material. In order to secure a hardness of the liquid crystal display device and a heat emission of the backlight unit 130, the rear cover 170 is formed of the metal material, preferably.

The rear cover 170 according to one embodiment of the present invention may include a cover plate 171 and a cover sidewall 173 so as to prepare a space.

The cover plate 171 supports the backlight unit 130, and covers a rear surface of the backlight unit 130.

The cover sidewall 173 is bent from an edge portion of the cover plate 171, thereby preparing a space on the cover plate 171 and supporting the panel support member 150. The cover sidewall 173 is covered by the frame sidewall 151a of the panel support member 150. In this case, the cover sidewall 173 and the frame sidewall 151a may be connected with each other by the use of coupling member such as adhesive member, screw or hook.

The front cover 190 is provided in a rectangular band shape having "Γ"-shaped cross section, and is connected with a lateral surface of the panel support member 150. The front cover 190 surrounds a front edge portion of the liquid crystal display panel 110, each lateral surface of the liquid crystal display panel 110, and each lateral surface of the panel support member 150, to thereby cover the panel driving circuit 120 connected with the liquid crystal display panel 110. In this case, the front cover 190 may be connected with the lateral surface of the panel support member 150 by a lateral connection method using a coupling member such as adhesive member, screw or hook.

Selectively, the panel support member 150 may be connected with a rear edge portion of the liquid crystal display panel 110 by the use of panel connection member. In this case, the liquid crystal display panel 110 is fixed to the panel support member 150 by the panel connection member, and thus, the front cover 190 may be omitted. In order to cover the panel driving circuit 120 connected with the liquid crystal display panel 110, the front cover 190 may be substituted by a partial front cover for covering one edge portion of the liquid crystal display panel 110 and one lateral surface being in contact with one edge portion of the liquid crystal display panel 110. Accordingly, except one lateral surface covered by the partial front cover, the remaining three lateral surfaces of the liquid crystal display panel 110 are not covered by the partial front cover and the panel support member 150, and are exposed to the outside of the liquid crystal display device, whereby a minimum bezel width is obtained in the three lateral surfaces of the liquid crystal display device. In this case, the liquid crystal display device according to the present invention may further include a lateral sealing member prepared in the three lateral surfaces of the liquid crystal display panel 110 so as to protect the exposed three lateral surfaces of the liquid crystal display device from an external shock and prevent a lateral-surface light leakage by an internal light reflection of the liquid crystal display panel 110.

The lateral sealing member is prepared to cover the three lateral surfaces of the liquid crystal display panel 110 except one lateral surface of the liquid crystal display panel 110. For example, on assumption that a display surface of the liquid crystal display panel 110 vertically stands, the lateral sealing member directly covers the three lateral surfaces of the liquid crystal display panel 110 including a left lateral surface, a left upper corner, an upper lateral surface, a right upper corner, and a right lateral surface of the liquid crystal display panel 110 except a lower lateral surface of the liquid crystal display panel 110. The lateral sealing member protects the three lateral surfaces of the liquid crystal display panel 110, which are not covered by an additional structure and are exposed to the outside of the liquid crystal display device, from an external shock, and prevents a lateral-surface light leakage in the liquid crystal display panel 110.

In the liquid crystal display device according to one embodiment of the present invention, according as the sheet support member 153 is disposed on the light-incidence portion 131a of the light guiding plate 131, the air gap (AG) is prepared between one edge portion 137a of the optical sheet portion 137 and the light guiding plate 131, whereby it is possible to realize a uniform luminance on the light-incidence portion 131a of the light guiding plate 131 by the light scattering occurring in the air gap (AG), to thereby minimize or prevent the hot spot occurring in the light-incidence portion 131a of the light guiding plate 131. Especially, in case of the liquid crystal display device according to one embodiment of the present invention, the sheet support member 153 has the white color so that the light scattering occurring in the air gap (AG) is increased, to thereby minimize or prevent the hot spot occurring in the light-incidence portion 131a of the light guiding plate 131.

Figure 7:
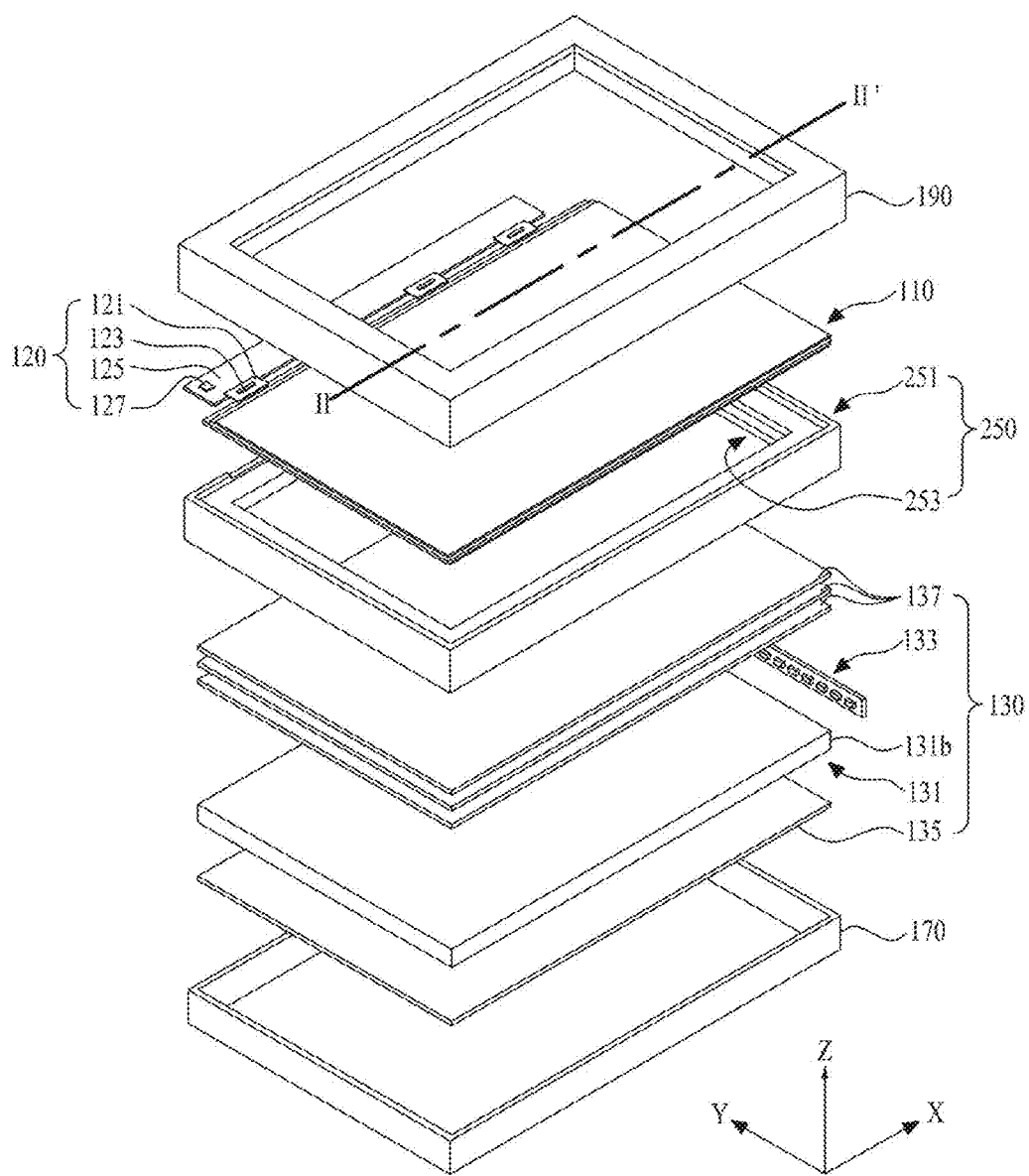
FIG. 7 is an exploded perspective view illustrating a liquid crystal display device according to one embodiment of the present invention.
Figure 8:
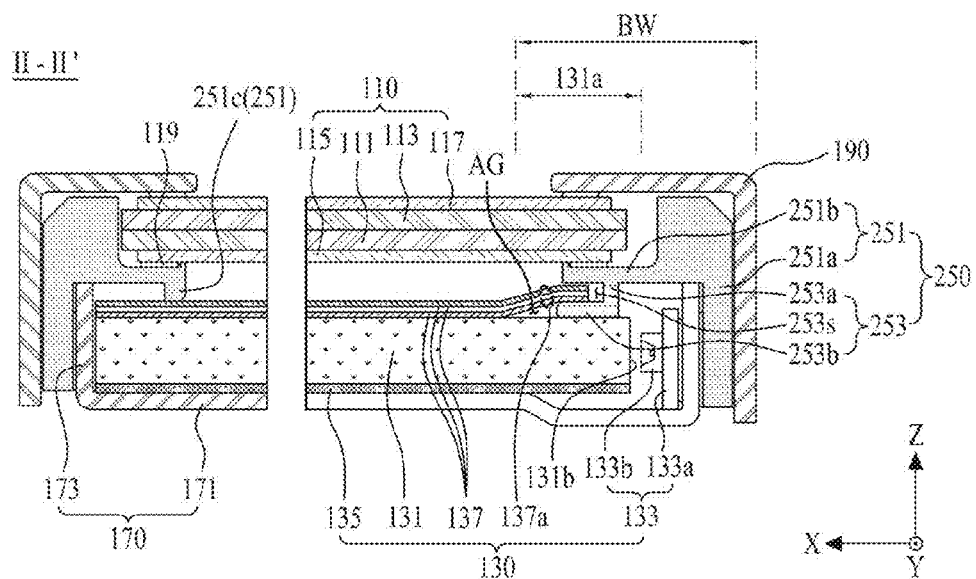
FIG. 8 is a cross sectional view along II-II' of FIG. 7.
Figure 9:
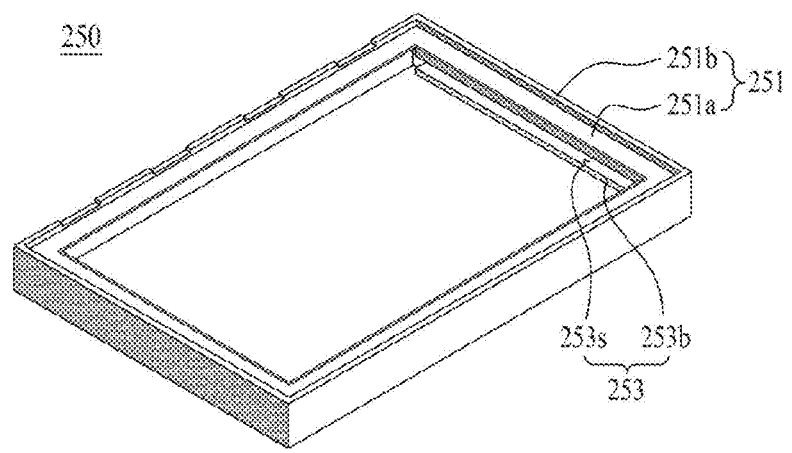
FIG. 9 illustrates a panel support member shown in FIG. 7.

FIG. 7 is an exploded perspective view illustrating a liquid crystal display device according to one embodiment of the present invention, FIG. 8 is a cross sectional view along II-IP of FIG. 7, and FIG. 9 illustrates a panel support member shown in FIG. 7, wherein the panel support member of FIG. 9 is obtained by chaining a structure of the panel support member shown in FIGS. 4 to 6. Hereinafter, only the panel support member and its related structure will be described, and a detailed description for the remaining structures except the panel support member will be omitted.

Referring to FIGS. 7 to 9, the panel support member 250 according to one embodiment of the present invention supports a rear edge portion of the liquid crystal display panel 110, and prepares an air gap (AG) between the light guiding plate 131 and one edge portion 137a of one side of the optical sheet portion 137 disposed on the light-incidence portion 131a of the light guiding plate 131, to thereby minimize or prevent a hot spot occurring in the light-incidence portion 131a of the light guiding plate 131. To this end, the panel support member 250 according to one embodiment of the present invention may include a support frame 251 and a sheet support member 253.

The support frame 251 supports a rear edge portion of the liquid crystal display panel 110. The support frame 251 according to one embodiment of the present invention may include a frame sidewall 251a, a panel support portion 251b, and a sheet fixing protrusion 251c.

The frame sidewall 251a is vertically prepared to cover each lateral surface of the backlight unit 130, and each lateral surface of the liquid crystal display panel 110.

The panel support portion 251b is prepared in a rectangular band shape at an inner lateral surface of the frame sidewall 251a, to thereby support the rear edge portion of the liquid crystal display panel 110. The panel support portion 251b is disposed between the optical sheet portion 137 and the liquid crystal display panel 110, and the panel support portion 251b supports the rear edge portion of the liquid crystal display panel 110 through the use of shock-absorbing member (shock-absorbing pad) 119. Alternatively, instead of the shock-absorbing member 119, the panel support portion 251b may be connected with the rear edge portion of the liquid crystal display panel 110 through the use of panel connection member. In this case, the panel connection member may be an adhesive or double-sided tape.

The sheet fixing protrusion 251c protrudes from a lower surface of the panel support portion 251b overlapped with the remaining edge portions except the light-incidence portion 131a of the light guiding plate 131 toward an upper surface of the optical sheet portion 137. The sheet fixing protrusion 251c presses an upper surface of the remaining edge portions except one edge portion of the optical sheet portion 137, thereby fixing the optical sheet portion 137 and preventing the optical sheet portion 137 from being moved.

The panel support portion 251 may be formed of a plastic material. Especially, the panel support portion 251 may be formed of a black-colored plastic material so as to minimize or prevent a light leakage at a lateral surface of the backlight unit 130.

The sheet support member 253 is provided on the light-incidence portion 131a of the light guiding plate 131, and is interposed between the light guiding plate 131 and one edge portion 137a of the optical sheet portion 137. The sheet support member 253 is disposed under the panel support portion 251b of the support frame 251, to thereby cover the light source 133 and the light-incidence portion 131a of the light guiding plate 131. Especially, the sheet support member 253 supports one edge portion 137a of the optical sheet portion 137 on the light-incidence portion 131a of the light guiding plate 131 so that it is possible to prepare the air gap (AG) between the light guiding plate 131 and one edge portion 137a of the optical sheet portion 137, to thereby minimize or prevent a hot spot occurring in the light-incidence portion 131a of the light guiding plate 131 when the light which is incident on the light-incidence portion 131a of the light guiding plate 131 is scattered by the air gap (AG). To this end, the sheet support member 253 may include a protruding portion 253a and a support bar 253b.

The protruding portion 253a protrudes from the support frame 251 overlapped with the light-incidence portion 131a of the light guiding plate 131, that is, a lower surface of the panel support portion 251b toward the light guiding plate 131. The protruding portion 253a covers a lateral surface of one edge portion 137a of the optical sheet portion 137 overlapped with the light-incidence portion 131a of the light guiding plate 131. The protruding portion 253a prevents one edge portion 137a of the optical sheet portion 137 disposed on the light-incidence portion 131a of the light guiding plate 131 from being moved.

The support bar 253b is prepared in a linear-shaped flat plate, and is disposed on the light-incidence portion 131a of the light guiding plate 131, thereby supporting one edge portion 137a of the optical sheet portion 137 and preparing the air gap (AG) between the light guiding plate 131 and one edge portion 137a of the optical sheet portion 137. That is, the support bar 253b is connected with a lower side of the protruding portion 253a while being provided at a predetermined interval from the panel support portion 251b in parallel, whereby the support bar 253b is interposed between the light guiding plate 131 and one edge portion 137a of the optical sheet portion 137, to thereby prepare the air gap (AG) between the light guiding plate 131 and one edge portion 137a of the optical sheet portion 137. The air gap (AG) is prepared in a stepped portion between the light guiding plate 131 and the support bar 253b along a length direction of the light-incidence lateral surface 131b by one edge portion 137a of the optical sheet portion 137 for covering an upper surface of the light guiding plate 131 and an upper surface of the support bar 253b.

The support bar 253b is provided at a predetermined interval form the panel support portion 251b while being in parallel to the panel support portion 251b, wherein a sheet insertion space is provided between the support bar 253b and the panel support portion 251 by a protruding height of the protruding portion 253a. Accordingly, one edge portion 137a of the optical sheet portion 137 is inserted into the sheet insertion space prepared between the panel support portion 251b of the support frame 251 and the support bar 253b of the sheet support member 253 so that it is possible to prevent one edge portion 137a of the optical sheet portion 137 from being moved by the protruding portion 253a.

The sheet support member 253 is connected with the support frame 251, that is, the lower surface of the panel support portion 251b by a double injection method. That is, the sheet support member 253 is formed of a white-colored plastic material, and is physically connected with the support frame 251 as one body. In other words, the support frame 251 and the sheet support member 253 are formed as one body by a double injection method using a white-colored plastic material and a black-colored plastic material. In this case, the sheet support member 253 has a white color which facilitates the light scattering in the air gap (AG), and the sheet support member 253 is connected with the support frame 251 overlapped with the light-incidence portion 131a of the light guiding plate 131 to have the sheet insertion space 253s, that is, the lower surface of the panel support portion 251b.

Accordingly, the air gap (AG), which is formed of an air layer, scatters the light which is incident on the light-incidence portion 131a of the light guiding plate 131 and is advancing toward the optical sheet portion 137, to thereby minimize or prevent the hot spot occurring in the light-incidence portion 131a of the light guiding plate 131 in accordance with a distance between each of the plurality of light emission diode packages 133b. That is, the light advancing from the light guiding plate 131 to the air gap (AG) is scattered in the air gap (AG) by a refraction difference between the light guiding plate 131 and the air layer and a light reflection on the support bar 253b, whereby a light amount is increased in an area which is not irradiated with the light emitted from each of the plurality of light emission diode packages 133b.

According as the sheet support member 253 prepares the air gap (AG) between the light guiding plate 131 and one edge portion 137a of the optical sheet portion 137, it is possible to realize a uniform luminance on the light-incidence portion 131a of the light guiding plate 131 by the light scattering occurring in the air gap (AG), to thereby minimize or prevent the hot spot occurring in the light-incidence portion 131a of the light guiding plate 131. Also, the sheet support member 253 having a white color is disposed on the light-incidence portion 131a of the light guiding plate 131, to thereby prevent black line defects occurring in the black-colored support frame 251.

The liquid crystal display device according to one embodiment of the present invention has the same effects as those of the liquid crystal display device shown in FIGS. 4 to 6.

Figure 10A:
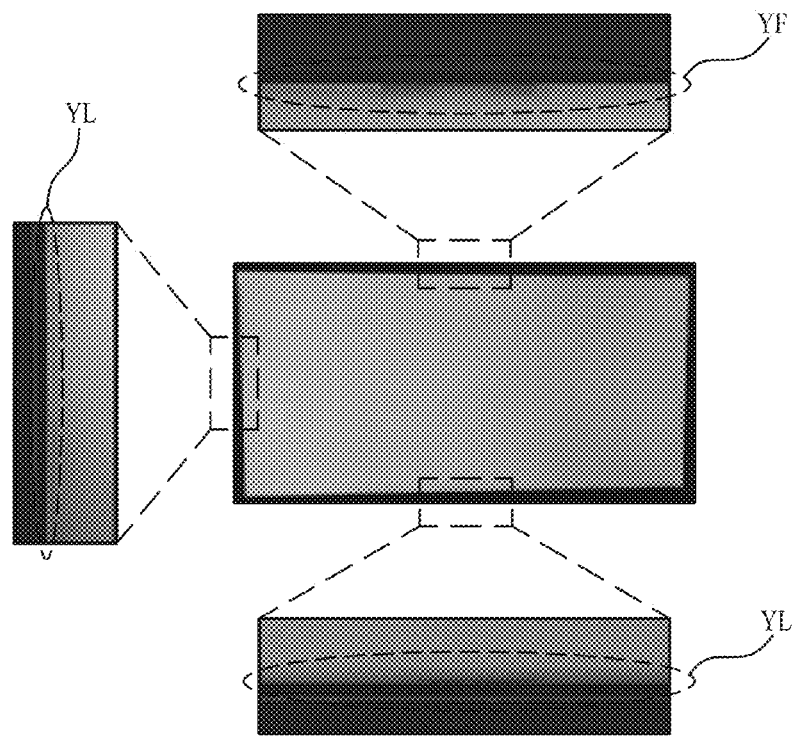
FIGS. 10A and 10B illustrate a front luminance in the liquid crystal display device according to the present invention and a front luminance in a liquid crystal display device according to a comparative example.
Figure 10B:
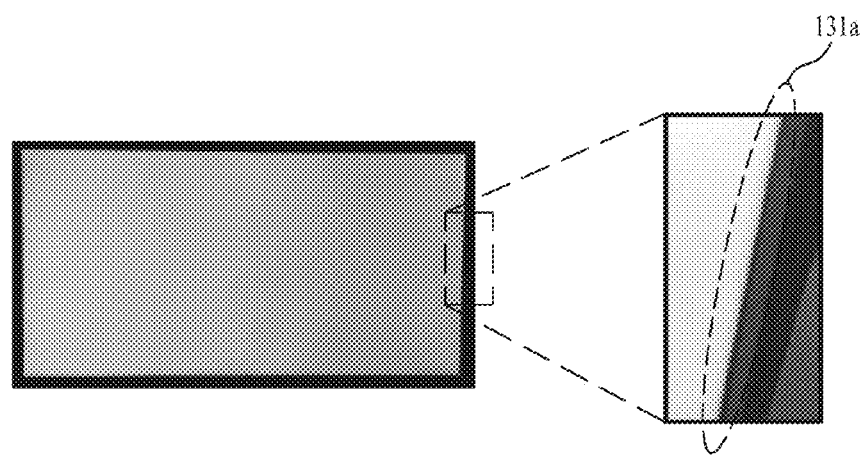

FIGS. 10A and 10B illustrate a front luminance in the liquid crystal display device according to the present invention and a front luminance of a liquid crystal display device according to a comparative example.

In the liquid crystal display device according to the comparative example, as shown in an expanded view of FIG. 10A, a bright line (YL) and a light bounce (YF) occur in an edge portion of a liquid crystal display panel due to a light scattering caused by a white-colored guide frame. Also, the liquid crystal display device according to the comparative example has a problem of luminance defect due to foreign matters in sheet cracks caused by mechanical vibrations.

In the liquid crystal display device according to the present invention, as shown in FIG. 10B, it is possible to possible to minimize or prevent the hot spot occurring in the light-incidence portion 131a of the light guiding plate 131, thereby improving mechanical reliability.

According as the support frame 151 and 251 having the black color and the sheet support member 153 and 253 having the white color are applied to the liquid crystal display device according to the present invention, it is possible to prevent the defect of front luminance in the light-incidence portion with a small bezel width, and to improve mechanical reliability.

According to the present invention, it is possible to prevent the defect of front luminance in the light-incidence portion with a small bezel width, and to improve mechanical reliability.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
    a liquid crystal display panel;
    a backlight unit including a light guiding plate with a light-incidence portion, a light source disposed in the light-incidence portion of the light guiding plate, and an optical sheet portion disposed on the light guiding plate;
    a panel support member for supporting a rear edge portion of the liquid crystal display panel, and defining an air gap between the light guiding plate and one edge portion of the optical sheet portion disposed on the light-incidence portion, wherein the optical sheet portion includes remaining edge portions except the one edge portion that are supported by remaining portions except the light-incidence portion of the light guiding plate; and
    a rear cover for receiving the backlight unit and supporting the panel support member,
    wherein the panel support member supports the rear edge portion of the liquid crystal display panel in between the rear edge portion of the liquid crystal display panel and a front edge portion of the optical sheet portion,
    wherein the panel support member includes a support frame for supporting the rear edge portion of the liquid crystal display panel, and defining the air gap between the light guiding plate and the one edge portion of the optical sheet portion, and
    wherein the support frame is disposed between the rear edge portion of the liquid crystal display panel and the one edge portion of the optical sheet portion, and disposed between the rear edge portion of the liquid crystal display panel and the remaining edge portions of the optical sheet portion.

2. The liquid crystal display device according to claim 1, wherein the panel support member further includes a sheet support member disposed under the support frame overlapped with the light-incidence portion and interposed between the light guiding plate and the one edge portion of the optical sheet portion.

3. A liquid crystal display device, comprising:
    a liquid crystal display panel;
    a backlight unit including a light guiding plate with a light-incidence portion, a light source disposed in the light-incidence portion of the light guiding plate, and an optical sheet portion disposed on the light guiding plate;
    a panel support member for supporting a rear edge portion of the liquid crystal display panel, and defining an air gap between the light guiding plate and one edge portion of the optical sheet portion disposed on the light-incidence portion; and
    a rear cover for receiving the backlight unit and supporting the panel support member,
    wherein the panel support member supports the rear edge portion of the liquid crystal display panel in between the rear edge portion of the liquid crystal display panel and a front edge portion of the optical sheet portion,
    wherein the panel support member includes:
        a support frame for supporting the rear edge portion of the liquid crystal display panel in between the rear edge portion of the liquid crystal display panel and a front edge portion of the optical sheet portion; and
        a sheet support member disposed under the support frame overlapped with the light-incidence portion and interposed between the light guiding plate and the one edge portion of the optical sheet portion,
    wherein the support frame includes:
        a panel support portion for supporting the rear edge portion of the liquid crystal display panel; and
        a protruding portion protruding from a lower surface of the panel support portion overlapped with the light-incidence portion toward the sheet support member, and covering a lateral surface of the optical sheet portion overlapped with the light-incidence portion.

4. The liquid crystal display device according to claim 3, wherein the sheet support member includes:
    a first support bar supported by the rear cover;
    a second support bar provided on the light-incidence portion and interposed between the light guiding plate and the one edge portion of the optical sheet portion; and
    a connection sidewall for connecting the first support bar and the second support bar with each other so as to be in contact with the protruding portion.

5. The liquid crystal display device according to claim 1, wherein the panel support member further includes a sheet support member connected with a lower surface of the support frame overlapped with the light-incidence portion and disposed between the light guiding plate and the one edge portion of the optical sheet portion.

6. A liquid crystal display device, comprising:
a liquid crystal display panel;
a backlight unit including a light guiding plate with a light-incidence portion, a light source disposed in the light-incidence portion of the light guiding plate, and an optical sheet portion disposed on the light guiding plate;
a panel support member for supporting a rear edge portion of the liquid crystal display panel, and defining an air gap between the light guiding plate and one edge portion of the optical sheet portion disposed on the light-incidence portion; and
a rear cover for receiving the backlight unit and supporting the panel support member,
wherein the panel support member supports the rear edge portion of the liquid crystal display panel in between the rear edge portion of the liquid crystal display panel and a front edge portion of the optical sheet portion,
wherein the panel support member includes:
a support frame for supporting the rear edge portion of the liquid crystal display panel in between the rear edge portion of the liquid crystal display panel and a front edge portion of the optical sheet portion; and
a sheet support member connected with a lower surface of the support frame overlapped with the light-incidence portion and disposed between the light guiding plate and the one edge portion of the optical sheet portion,
wherein the support frame includes:
a panel support portion for supporting the rear edge portion of the liquid crystal display panel; and
a sheet fixing protrusion protruding from a lower surface of the panel support portion overlapped with the remaining edge portions except the light-incidence portion toward the optical sheet portion.

7. The liquid crystal display device according to claim 5, wherein the sheet support member includes:
a protruding portion protruding from a lower surface of the support frame overlapped with the light-incidence portion toward the light guiding plate and covering a lateral surface of the optical sheet portion overlapped with the light-incidence portion; and
a support bar interposed between the light guiding plate and the edge portion of the optical sheet portion and connected with the protruding portion.

8. The liquid crystal display device according to claim 2, wherein the sheet support member has a white color.

9. The liquid crystal display device according to claim 2, wherein the support frame has a black color, and the sheet support member has a white color.

10. The liquid crystal display device according to claim 9, wherein the one edge portion of the optical sheet portion is inserted into a sheet insertion space defined between the lower surface of the support frame and the sheet support member.

11. A liquid crystal display device, comprising:
a liquid crystal display panel;
a backlight unit including a light guiding plate with a light-incidence portion, a light source disposed in the light-incidence portion of the light guiding plate, and an optical sheet portion disposed on the light guiding plate;
a panel support member for supporting a rear edge portion of the liquid crystal display panel, and defining an air gap between the light guiding plate and one edge portion of the optical sheet portion disposed on the light-incidence portion; and
a rear cover for receiving the backlight unit and supporting the panel support member,
wherein the panel support member supports the rear edge portion of the liquid crystal display panel in between the rear edge portion of the liquid crystal display panel and a front edge portion of the optical sheet portion,
wherein the panel support member includes:
a support frame for supporting the rear edge portion of the liquid crystal display panel in between the rear edge portion of the liquid crystal display panel and a front edge portion of the optical sheet portion; and
a sheet support member disposed under the support frame overlapped with the light-incidence portion and interposed between the light guiding plate and the one edge portion of the optical sheet portion,
wherein the sheet support member has a different color than the support frame.

12. The liquid crystal display device according to claim 1, wherein the panel support member covers each lateral surface of the liquid crystal display panel.

13. The liquid crystal display device according to claim 1, wherein the support frame has a black color.

14. The liquid crystal display device according to claim 1, wherein the panel support member further includes a sheet support member for defining the air gap between the light guiding plate and the one edge portion of the optical sheet portion.

15. The liquid crystal display device according to claim 14, wherein the sheet support member is disposed between the rear edge portion of the liquid crystal display panel and the one edge portion of the optical sheet portion, and disposed under the support frame that is overlapped with the light-incidence portion.

16. The liquid crystal display device according to claim 14, wherein the sheet support member is interposed between the one edge portion of the optical sheet portion and the light-incidence portion of the light guiding plate, and
wherein the one edge portion of the optical sheet portion and the light-incidence portion of the light guiding plate are overlapped with the rear edge portion of the liquid crystal display panel.

17. The liquid crystal display device according to claim 14, wherein the sheet support member has a different color than the support frame.

18. The liquid crystal display device according to claim 14, wherein the support frame has a black color, and the sheet support member has a white color.

* * * * *